United States Patent
Cole et al.

(10) Patent No.: US 10,475,129 B2
(45) Date of Patent: Nov. 12, 2019

(54) COMPUTERIZED PERSON-TO-PERSON ASSET ROUTING SYSTEM

(71) Applicant: Bank of America Corporation, Charlotte, NC (US)

(72) Inventors: Kevin T. Cole, Charlotte, NC (US); Matthew Hsieh, Charlotte, NC (US); Alicia C. Jones-McFadden, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 787 days.

(21) Appl. No.: 14/863,603

(22) Filed: Sep. 24, 2015

(65) Prior Publication Data

US 2017/0091873 A1  Mar. 30, 2017

(51) Int. Cl.
*G06Q 40/00* (2012.01)
*G06Q 20/10* (2012.01)

(52) U.S. Cl.
CPC ............. *G06Q 40/12* (2013.12); *G06Q 20/10* (2013.01)

(58) Field of Classification Search
None
See application file for complete search history.

(56) References Cited

U.S. PATENT DOCUMENTS

| | | | |
|---|---|---|---|
| 5,940,844 A | 8/1999 | Cahill et al. | |
| 6,991,158 B2 | 1/2006 | Munte | |
| 7,702,588 B2 | 4/2010 | Gilder et al. | |
| 7,812,986 B2 | 10/2010 | Graham et al. | |
| 7,896,235 B2 | 3/2011 | Ramachandran | |
| 7,953,441 B2 | 5/2011 | Lors | |
| 8,045,784 B2 | 10/2011 | Price et al. | |
| 8,214,289 B2 | 7/2012 | Scipioni | |
| 8,244,638 B2 | 8/2012 | Agarwal et al. | |
| 8,275,710 B1 | 9/2012 | Hildebrand | |
| 8,379,914 B2 | 2/2013 | Nepomniachtchi et al. | |
| 8,380,626 B2 | 2/2013 | Huff et al. | |
| 8,417,628 B2 | 4/2013 | Poplawski et al. | |

(Continued)

OTHER PUBLICATIONS

USAA Deposit @Mobile iPhone App USAA (https://www.usaa.com), downloaded Sep. 2, 2010.

*Primary Examiner* — Peter Ludwig
*Assistant Examiner* — Gregory S Cunningham, II
(74) *Attorney, Agent, or Firm* — Michael A. Springs; Moore & Van Allen PLLC; Peter B. Stewart

(57) ABSTRACT

Disclosed is a computerized person-to-person asset routing system. The system typically includes a processor, a memory, and a person-to-person asset routing module that is stored in the memory and executable by the processor. The person-to-person asset routing module is typically configured for receiving an electronic image file containing an image of a negotiable instrument from a payor computing device; processing the image of the negotiable instrument to extract transaction data; identifying a payor account; comparing the extracted transaction information to a payee information repository; based on comparing the extracted transaction information to the payee information repository, identifying payee routing information associated with a payee; and based on identifying the payor account and the payee routing information, transferring assets from the payor account to the payee via the payee routing information.

21 Claims, 5 Drawing Sheets

(56) References Cited

U.S. PATENT DOCUMENTS

| | | |
|---|---|---|
| 8,473,412 B2 | 6/2013 | Huff et al. |
| 8,474,704 B1 | 7/2013 | Grimm et al. |
| 8,489,504 B1 * | 7/2013 | Gupta ................. G06Q 20/042 705/39 |
| 8,699,779 B1 | 4/2014 | Prasad et al. |
| 8,705,836 B2 | 4/2014 | Gorski et al. |
| 8,714,336 B2 | 5/2014 | Csulits et al. |
| 8,913,820 B2 | 12/2014 | Bennett et al. |
| 8,934,701 B2 | 1/2015 | Bennett et al. |
| 8,977,571 B1 | 3/2015 | Bueche, Jr. et al. |
| 9,064,248 B2 | 6/2015 | Huff et al. |
| 9,087,389 B2 | 7/2015 | Bennett et al. |
| 9,129,197 B1 * | 9/2015 | Madhani .......... G06K 19/06037 |
| 9,165,291 B1 * | 10/2015 | Andersen ................ G06Q 20/10 |
| 9,779,452 B1 * | 10/2017 | Medina ............... G06Q 20/0425 |
| 10,360,539 B1 * | 7/2019 | Sherman |
| 2002/0152166 A1 | 10/2002 | Dutta et al. |
| 2009/0185241 A1 | 7/2009 | Nepomniachtchi |
| 2009/0185736 A1 | 7/2009 | Nepomniachtchi |
| 2009/0185737 A1 | 7/2009 | Nepomniachtchi |
| 2009/0185738 A1 | 7/2009 | Nepomniachtchi |
| 2010/0122216 A1 | 5/2010 | Song et al. |
| 2010/0150424 A1 | 6/2010 | Nepomniachtchi et al. |
| 2013/0022231 A1 * | 1/2013 | Nepomniachtchi .. G06Q 20/042 382/102 |
| 2014/0012754 A1 * | 1/2014 | Hanson ................. G06Q 20/40 705/44 |
| 2016/0012465 A1 * | 1/2016 | Sharp .................... G06Q 20/18 705/14.17 |

* cited by examiner

2

COMPUTERIZED PERSON-TO-PERSON ASSET ROUTING SYSTEM

FIELD OF THE INVENTION

The present invention embraces a computerized person-to-person asset routing system. The system typically includes a processor, a memory, and a person-to-person asset routing module that is stored in the memory and executable by the processor. The person-to-person asset routing module is typically configured for processing an image of the negotiable instrument to extract transaction data, comparing the extracted transaction data to a recipient information repository in order to identify recipient routing information, and transferring assets to the recipient via the payee routing information.

BACKGROUND

With the wide adoption of credits cards, debit cards, electronic payment devices, online shopping systems, and online banking systems, very few people today carry a lot of cash or write many checks. However, people still need to transfer money to each other for all sorts of reasons. For example, a person may want to pay a friend back for money recently borrowed from the friend, or a person may want to send money to a relative as a gift, or a person or entity may want to pay another person or entity, such as business paying a bank a loan payment or a person paying a car payment to the bank or a loan company. Giving or lending money to another person, however, can be difficult when you don't have cash on hand and/or if the person is not physically present. The process may need to involve going to an automated teller machine (ATM) or mailing the person a check, both of which can be time consuming and inconvenient depending on the situation.

Money can be transferred from one person to another person or entity using electronic banking systems, but these systems traditionally require that the sender know account information for the receiver in order to instruct the bank to transfer money to the proper account. Most people do not know the account numbers of their friends, nor do most people want to widely publicize their account numbers for security reasons.

Some third party service providers try to facilitate payments from one person to another, but many people do not like these systems because they require opening yet another account with another online entity, remembering yet another username and password, and disclosing confidential financial institution account information to these other companies. In addition to the inconvenience and the security concerns, these systems generally take time set up and are not user-friendly.

For all these reasons and others, there is a need for improved user-friendly systems and methods for transferring money between two people and/or other entities, especially if such systems can transfer money directly to and/or from financial institution accounts, such as demand deposit accounts (e.g., checking accounts), and savings accounts.

SUMMARY

In one aspect, the present invention embraces a method for providing person-to-person asset routing. The present invention also embraces a system configured for performing one or more of the steps of the method. While the term person-to-person is used herein, the term is used in the broader sense to mean person-to-person, person-to-entity, entity-to-person, and/or entity-to-entity.

Typically, the system includes a computer apparatus including a processor, a memory, a network communication device, and a person-to-person asset routing module that is stored in the memory and executable by the processor. The module is typically configured for: receiving an electronic image file containing an image of a negotiable instrument from a payor computing device; processing the image of the negotiable instrument to extract transaction data, wherein processing the image of the negotiable instrument comprises extracting a transaction amount and payee identification information, wherein the transaction amount and payee identification information extracted from the image of the negotiable instrument comprise alphanumeric text extracted from the image of the negotiable instrument contained in the electronic image file; identifying a payor account; comparing the extracted payee identification information to a payee information repository; based on comparing the extracted identification information to the payee information repository, identifying payee routing information associated with a payee; and based on identifying the payor account and the payee routing information, transferring an amount equal to the transaction amount from the payor account to the payee via the payee routing information.

In one embodiment, the module is configured for: determining that the extracted transaction data is insufficient to identify the payee routing information; prompting the payor computing device to display a graphical user interface, the graphical user interface being configured to prompt the payor to provide supplemental payee identification information; receiving, via the graphical user interface, the supplemental payee identification information; and comparing the supplemental payee identification information to the payee information repository.

In another embodiment, identifying the payee routing information associated with the payee is further based on comparing the supplemental payee identification information to the payee information repository.

In another embodiment, the module is configured for determining that the supplemental payee identification information is insufficient to identify the payee routing information; based on determining that the supplemental payee identification information is insufficient to identify the payee routing information, communicating a payment routing information request to the payee; and thereafter, determining that the payee has provided payment routing information. In addition, identifying the payee routing information associated with a payee may be further based on the payment routing information provided by the payee.

In yet another embodiment, the module is configured for comparing the extracted transaction data to transaction history information associated with the payor; and identifying the payee routing information associated with the payee is further based on comparing the extracted transaction data to the transaction history information associated with the payor.

In yet another embodiment, the module is configured for: based on identifying the payee routing information, retrieving stored payee information from the payee information repository, the stored payee information being associated with the payee routing information; prompting the payor computing device to display a graphical user interface, the graphical user interface being configured to (i) display the stored payee information and (ii) prompt the payor to provide a payment confirmation; and receiving the payment confirmation from the payor computing device. In addition, transferring the amount equal to the transaction amount from the payor account to the payee via the payee routing information may be further based on receiving the payment confirmation from the payor computing device.

In yet another embodiment, processing the image of the negotiable instrument comprises extracting payor account information; and identifying the payor account is based on the extracted payor account information.

In yet another embodiment, identifying the payor account is based on payor account information received from the payor computing device.

In yet another embodiment, the module is configured for: identifying a payor debt account defining a balance, the debt account being maintained by the payee; and, based on identifying the payor debt account and transferring the amount from the payor account to the payee, applying a credit to the balance of the payor debt account, the credit being equal to the transferred amount.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
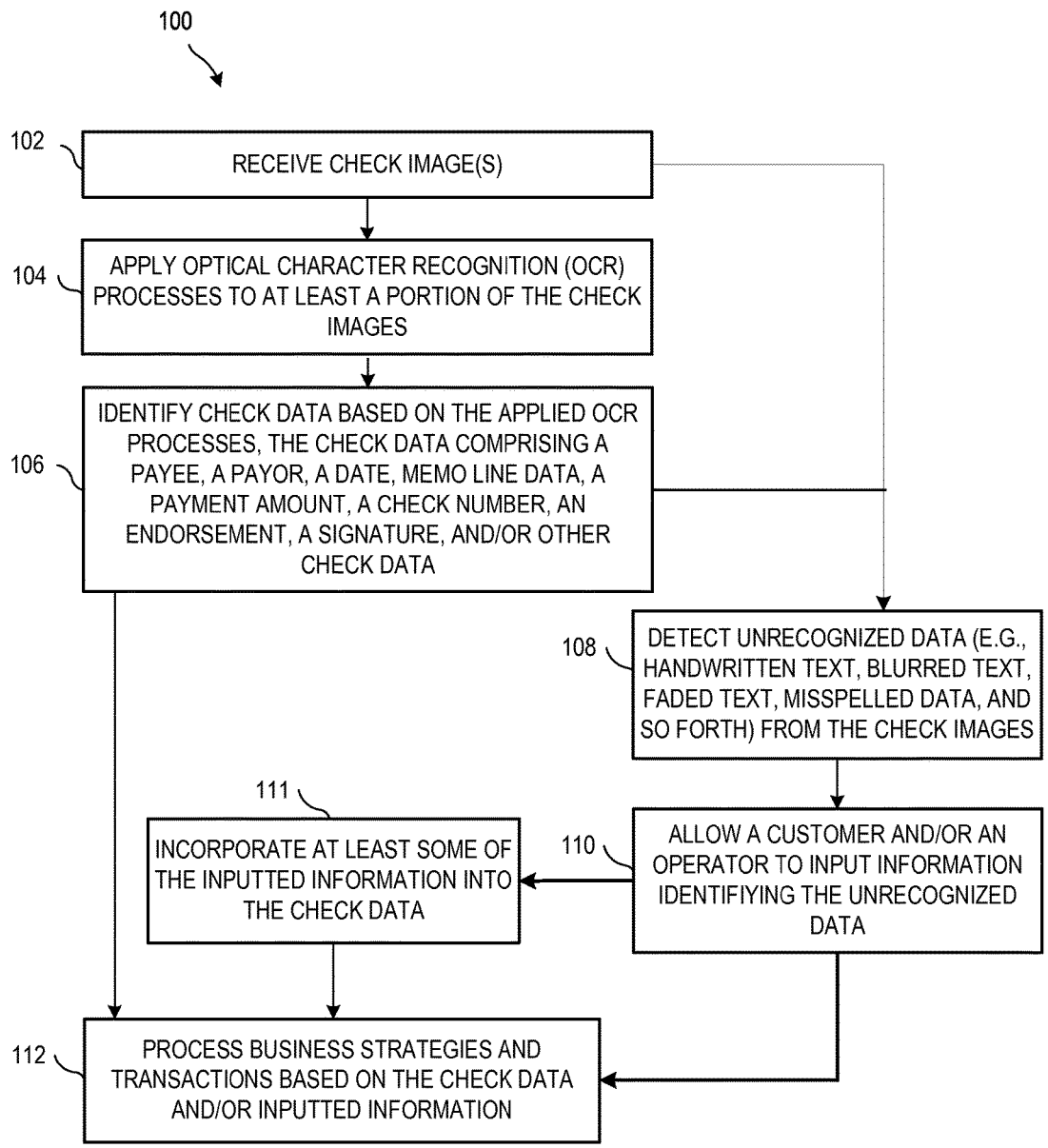
Figure 2:
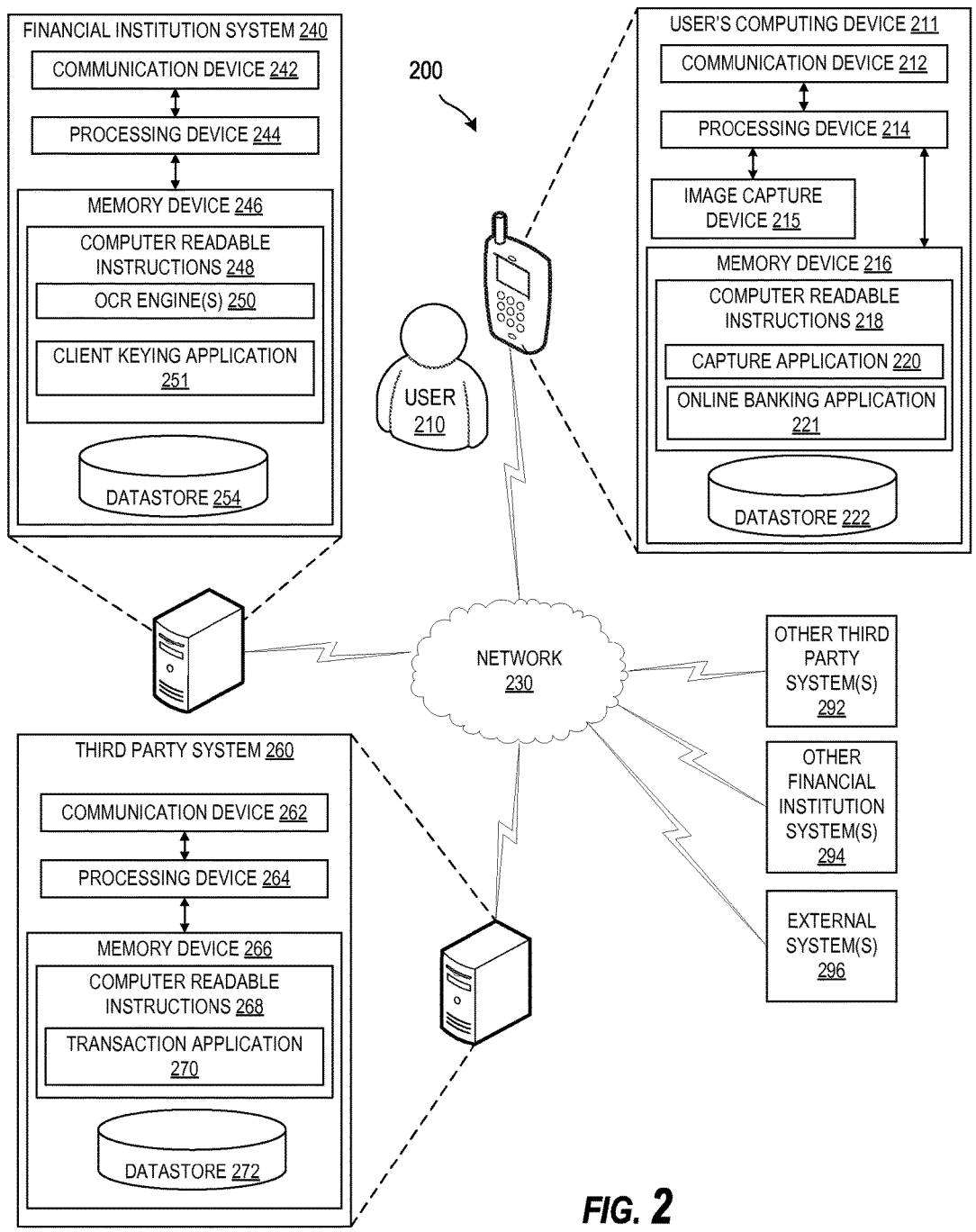
Figure 3:
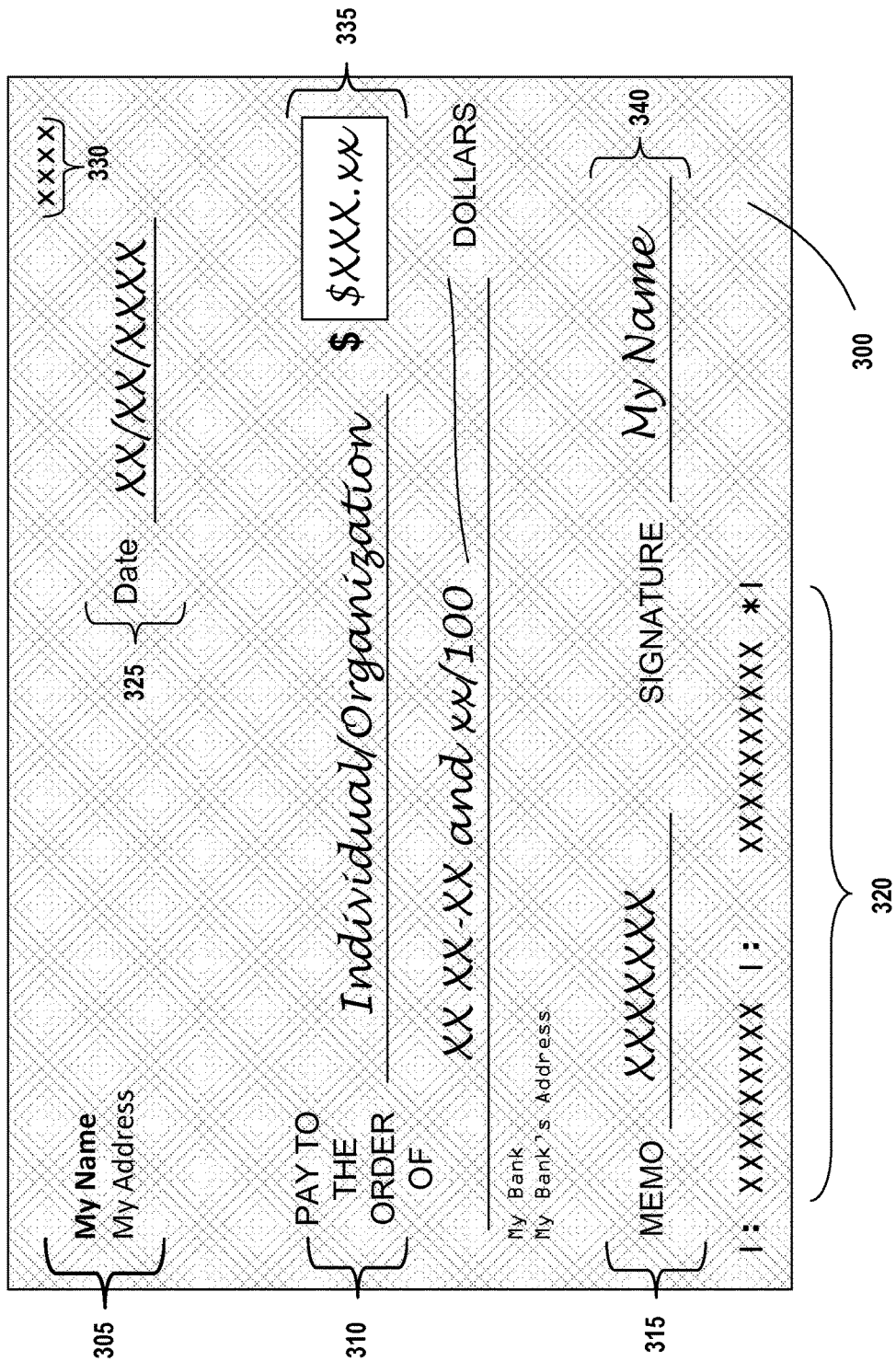
Figure 4:
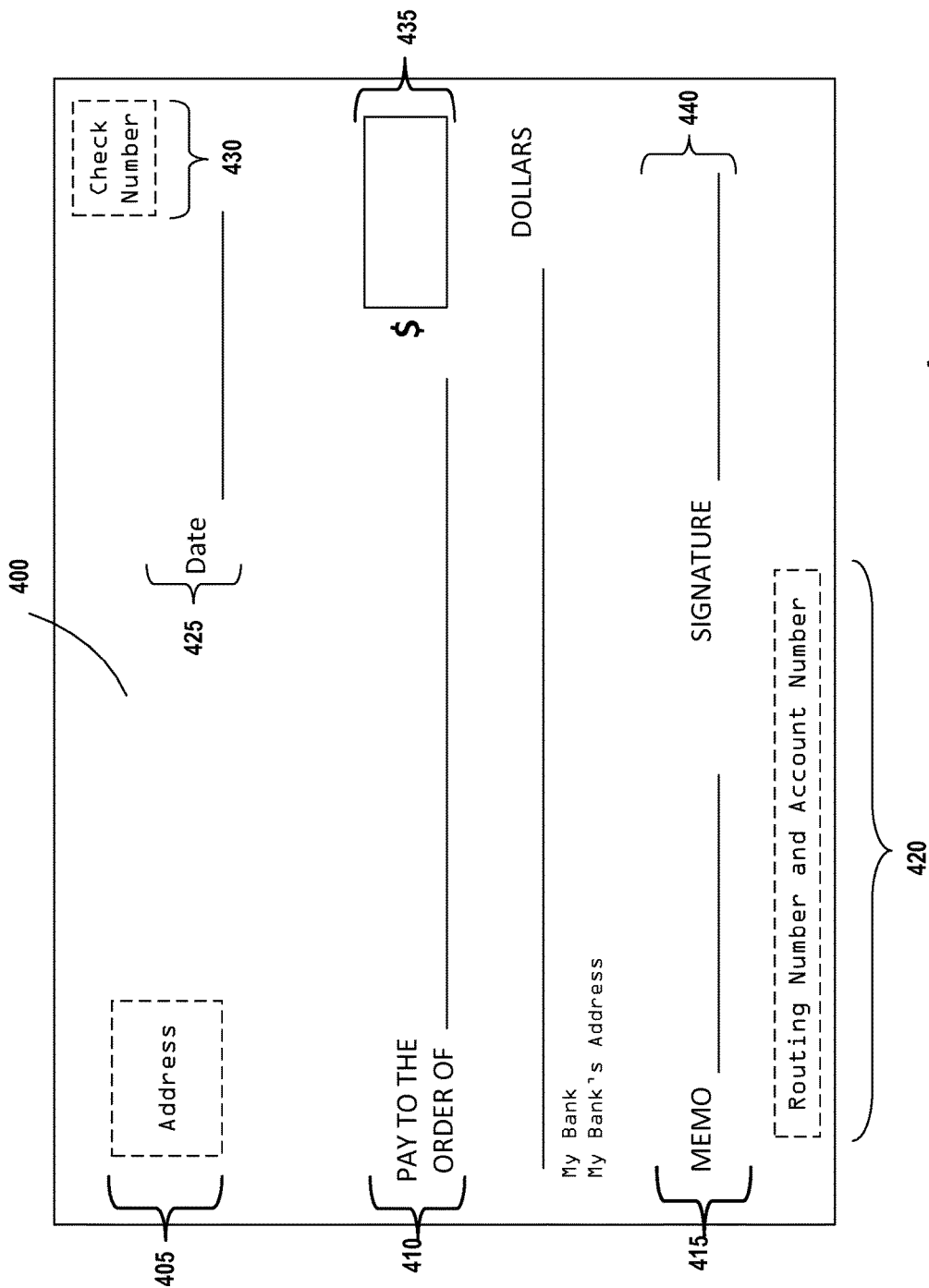
Figure 5:
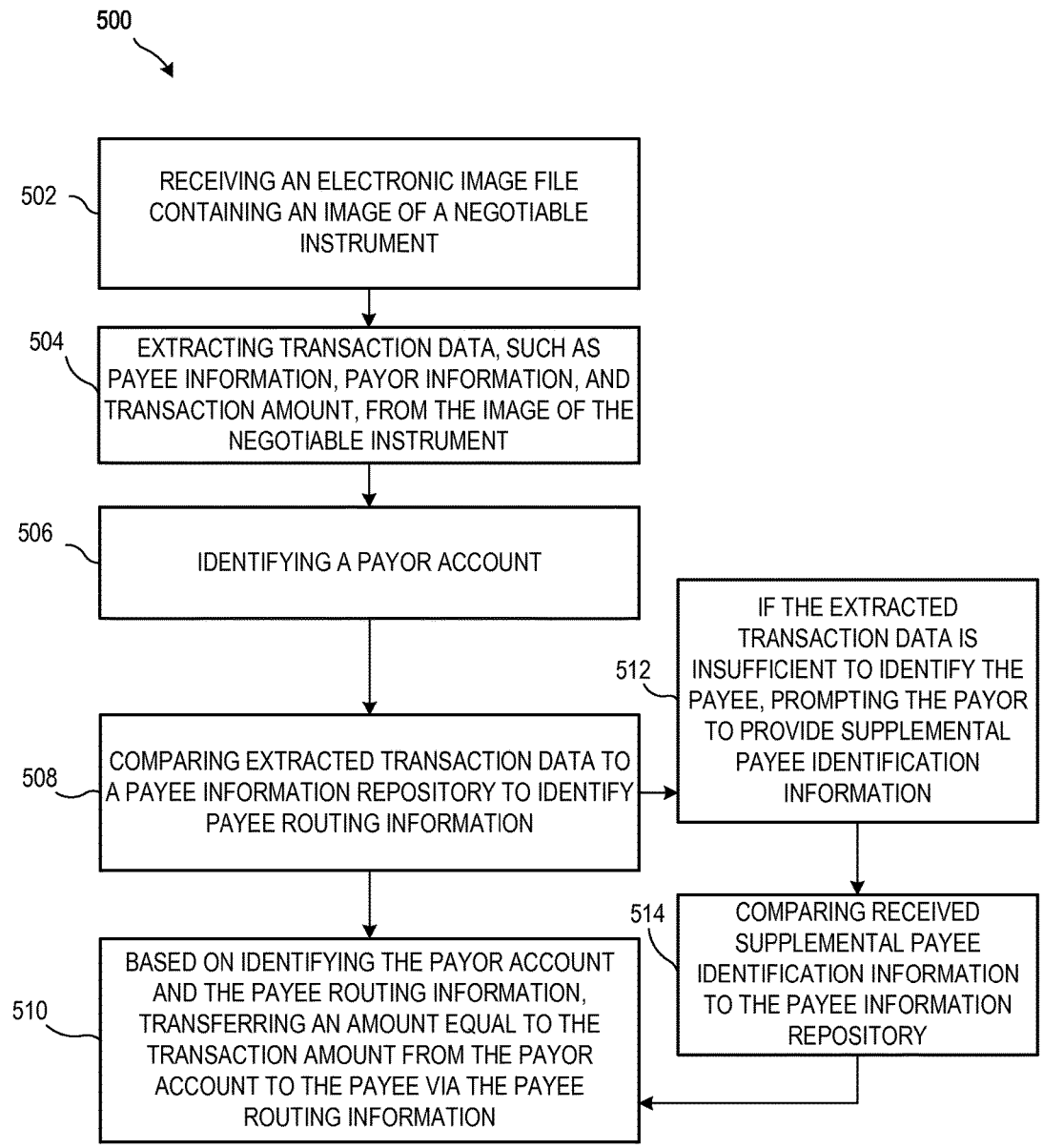

Having thus described embodiments of the invention in general terms, reference will now be made the accompanying drawings, wherein:

FIG. 1 is a flowchart illustrating a system and method for identifying and extracting check data in accordance with various embodiments;

FIG. 2 provides a block diagram illustrating a system and environment for extracting and identifying check data in accordance with various embodiments;

FIG. 3 illustrates an exemplary image of a financial record in accordance with various embodiments;

FIG. 4 illustrates an exemplary template of a financial record in accordance with various embodiments; and FIG. 5 is a flowchart illustrating a method for providing person-person payments.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution. In this regard, other businesses can take the place of or work in conjunction with the financial institution to perform one or more of the processes or steps described herein as being performed by a financial institution. Still in other embodiments of the invention the financial institution described herein may be replaced with other types of businesses that offer payment account systems to customers.

As used herein, an "online banking account" is an account that is associated with one or more user accounts at a financial institution. For example, the user may have an online banking account that is associated with the user's checking account, savings account, investment account, and credit account at a particular financial institution (e.g., the financial institution providing the online banking account). In some embodiments, the user's online banking account at a particular financial institution may also provide the user with access and information regarding user accounts that are maintained other financial institutions. For example, the user may provide a first financial institution with login information associated with the user's online banking account at a second financial institution. Accordingly, the user may be able to access the online banking account. A username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded). In other embodiments, the "customer" may refer to the user.

The embodiments described herein may refer to the use of a transaction, transaction event or point of transaction event to trigger the steps, functions, routines, or the like described herein. In various embodiments, occurrence of a transaction triggers the sending of information such as offers and the like. Unless specifically limited by the context, a "transaction", "transaction event" or "point of transaction event" refers to any communication between the customer and the merchant, financial institution, or other entity monitoring the customer's activities. In some embodiments, for example, a transaction may refer to a purchase of goods or services, a return of goods or services, a payment transaction, a credit transaction, or other interaction involving a customer's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a customer's computer or mobile device, a customer accessing their e-wallet or any other interaction involving the customer and/or the customer's device that is detectable by the financial institution. As further examples, a transaction may occur when an entity associated with the customer is alerted via the transaction of the customer's location. A transaction may occur when a customer accesses a building, uses a rewards card, and/or performs an account balance query. A transaction may occur as a customer's mobile device establishes a wireless connection, such as a Wi-Fi connection, with a point-of-sale (or point-of-transaction) terminal. In some embodiments, a transaction may include one or more of the following: purchasing, renting, selling, and/or leasing goods and/or services (e.g., groceries, stamps, tickets, DVDs, vending machine items, and the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a customer's device, such as a customer's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the customer's perspective, the merchant's perspective or both. In some embodiments, the point-of-transaction device refers only to a customer's device, in other embodiments it refers only to a merchant device, and in yet other embodiments, it refers to both a customer device and a merchant device interacting to perform a transaction. For example, in one embodiment, the point-of-transaction device refers to the customer's mobile device configured to communicate with a merchant's point of sale terminal, whereas in other embodiments, the point-of-transaction device refers to the merchant's point of sale terminal configured to communicate with a customer's mobile device, and in yet other embodiments, the point-of-transaction device refers to both the customer's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. A point-of-transaction device could be or include any device that a customer may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In some embodiments, a point-of-transaction device is operated in a public place (e.g., on a street corner, at the doorstep of a private residence, in an open market, at a public rest stop, or the like). In other embodiments, the point-of-transaction device is additionally or alternatively operated in a place of business (e.g., in a retail store, post office, banking center, grocery store, factory floor, or the like). In accordance with some embodiments, the point-of-transaction device is not owned by the customer of the point-of-transaction device. Rather, in some embodiments, the point-of-transaction device is owned by a mobile business operator or a point-of-transaction operator (e.g., merchant, vendor, salesperson, or the like). In yet other embodiments, the point-of-transaction device is owned by the financial institution offering the point-of-transaction device providing functionality in accordance with embodiments of the invention described herein.

As presented herein, embodiments that detect and extract specific data from images and that analyze, process, and distribute extracted metadata are provided. As used herein, the term "financial record" refers to, but is not limited to records associated with financial data, account data, government data, legal data, identification data, and the like. Exemplary financial records include legal documents, wills, court papers, legal memorandum, leases, birth certificates, negotiable instruments (e.g., checks), receipts, contracts, loan documents, financial statements, bills, and combinations thereof. Although the disclosure is directed to financial records, it will be understood that non-financial records such as social communications, advertising, blogs, opinion writing, and the like may also be applicable to the disclosure presented herein. In cases were non-financial records are used, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof.

In one aspect, the present invention is directed to a system that is configured to provide person-to-person (P2P) payments based on receiving an image of a negotiable instrument (e.g., a check) from a payor (e.g., a customer wishing to send funds to another person or entity) and then processing the image. Typically, the image of the negotiable instrument is processed to extract payee identification information (e.g., the name of the desired recipient of a payment). This extracted payee identification information may then be used to look up payee routing information (e.g., account information for the payee) from a payee information repository. Based on this payee routing information a payment may be made from the payor to the payee.

Referring now to the figures, FIG. 1 provides a flowchart illustrating a process 100 for identifying and extracting data from check images or images of other negotiable instruments. One or more devices, such as the one or more systems and/or one or more computing devices and/or servers of FIG. 2, can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more check images are received. The check images typically include the front portion of a check, the back portion of a check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100. Although check images are described in FIG. 1, it will be understood that any type of financial record image or non-financial record image may be included in process 100.

In some embodiments, each of the check images includes financial record data (e.g., transaction data). The financial record data may include dates financial records are issued, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, other transaction information, and the like. In some embodiments, the check images include markings. The markings may include, for example, text, numbers, symbols, other characters, lines, shadows, shapes, ink blots, stains, logos, paper tears, smudges, watermarks, any visible marking on the paper check, any visible marking applied electronically to the check image, or any pixel/texel quantity thereof.

Although check images are illustrated in FIG. 1, it will be understood that any type of financial record image may be received in accordance with the embodiments of FIG. 1. Exemplary check images include PDF files, scanned documents, digital photographs, and the like. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, agents of account holders, joint account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some exemplary embodiments, a customer or other entity takes a picture of a check at a point of sales or an automated teller machine (ATM) and communicates the resulting check image to a point-of-transaction device or point-of-sale device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. In other embodiments, a financial institution may receive the actual check from the customer or other entity and then create an image of the check using a capture device. The capture device can include any type or number of devices for capturing images or converting a check to any type of electronic format such as a camera, personal computer, laptop, notebook, scanner, mobile device, and/or other device.

As illustrated at block 104, optical character recognition (OCR) processes and/or other image processing techniques are applied to at least a portion of the check images. At least one OCR process may be applied to each of the check images or some of the check images. The OCR processes enables the system to convert handwritten or printed text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters. In some embodiments, other image processing techniques such as intelligent word recognition (IWR) and intelligent character recognition (ICR) may be used to recognize and extract handwritten text.

In some embodiments, the OCR process includes location fields for determining the position of data on the check image. Based on the position of the data, the system can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the check into quadrants. As referred to herein, the term quadrant is used broadly to describe the process of differentiating elements of a check image by separating portions and/or elements of the image of the check into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted as metadata, text, or code representing the contents of the quadrant. In some embodiments, the quadrants of the image of the check that are not identified as having valuable and/or useful information are not extracted from the image.

In additional embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants (e.g., as depicted in FIG. 4).

In alternative or additional embodiments, the OCR process includes predefined fields to identify data. The predefined field includes one or more characters, words, or phrases that indicate a type of data. In such embodiments, the system of process 100 extracts all the data presented in the check image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated at block 106, check data is identified based on the applied OCR processes. In some embodiments, the check data includes a payee, a payor, a date, memo line data, a payment amount, a check number, and endorsement, a signature and/or other check data. The check data, in some embodiments, is identified based on the final objectives of the process 100. As discussed in more detail below, the final objectives of the process 100 can include a variety of business strategies and transactions. In other embodiments, the system of process 100 identifies all recognizable text and markings in the check images. In such cases, the system may further narrow or expand the identified check data as needed.

As illustrated at block 108, unrecognized data from the check images is detected. In some embodiments, the unrecognized data includes characters, text, shading, or any other data not identified by the OCR processes. In such embodiments, the unrecognized data is detected following implementation of at least one of the OCR processes. In other embodiments, the unrecognized data is detected prior to application of the OCR processes. For example, the unrecognized data may be removed and separated from the check images or otherwise not subjected to the OCR processes. In one exemplary situation, the system may determine that handwritten portions of a check image should not undergo OCR processing due to the difficulty in identifying such handwritten portions. Exemplary unrecognized data includes handwritten text, blurred text, faded text, misaligned text, misspelled data, any data not recognized by the OCR processes or other data recognition techniques, and the like. In other cases, at least a portion of some or all of the check images may undergo pre-processing to enhance or correct the unrecognized data. For example, if the text of a check image is misaligned or blurry, the system may correct that portion of the check image before applying the OCR processes to increase the probability of successful text recognition in the OCR processes or other image processes.

As illustrated at block 110, inputted information identifying the unrecognized data from a customer and/or an operator is received. In some embodiments, an operator is provided with the portions of a check image corresponding to the unrecognized data. The operator can view the unrecognized data to translate the unrecognized data into text and input the translation into a check data repository. In this way, the system "learns" to recognize previously unrecognized data such that when the system reviews the same or similar unrecognized data in the future, such data can be easily identified by reference to the check data repository. In other embodiments, the system may present an online banking customer with the unrecognized data (e.g., an image of at least the portion of a check containing unrecognized data) to solicit input directly from the customer. For example, the customer may be presented with operator-defined terms of previously unrecognized data to verify if such terms are correct. The system may solicit corrective input from the customer via an online banking portal, a mobile banking application, and the like. If an operator initially determines that the handwriting on the memo line reads "house flaps," the customer may subsequently correct the operator's definition and update the check data repository so that the handwritten portion correctly corresponds to "mouse traps." In some embodiments, the customer's input is stored in a customer input repository, which is linked to the check data repository associated with the OCR processes. For example, the system can create a file path linking the customer input repository with the check data repository to automatically update the check data repository with the customer input. In other embodiments, the check data repository and/or customer input repository includes stored customer data or account data. Stored customer signatures, for example, may be included in the check data repository and/or customer input repository. As illustrated at block 111, at least some of the inputted information is incorporated in the check data. In cases where the OCR processes utilizes a repository that includes manual input such as a check data repository or customer input repository, previously unrecognized data can be matched to definitions submitted by the operator and/or customer.

As illustrated at block 112, business strategies and transactions are processed based on at least one of the check data and the inputted information. Metadata extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

Referring now to FIG. 2, a block diagram illustrates an environment 200 for detecting and extracting check data. The environment 200 may include a computing device 211 (e.g., a laptop, personal computer, mobile device, smartphone, tablet computer, personal digital assistant, and the like) of a user 210 (e.g., an account holder, a mobile application user, an image owner, a bank customer, and the like), a third party system 260, and a financial institution system 240. In some embodiments, the third party system 260 corresponds to a third party financial institution. The environment 200 may further include one or more third party systems 292 (e.g., a partner, agent, or contractor associated with a financial institution), one or more other financial institution systems 294 (e.g., a credit bureau, third party banks, and so forth), and one or more external systems 296. The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The computing device 211, the third party system 260, and the financial institution system 240 each includes a computer system, server, multiple computer systems and/or servers or the like. The financial institution system 240, in the embodiments shown has a communication device 242 (e.g., a network communication device) communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository. The datastore 254 may also include a payee information repository as described below. The financial institution system 240 typically includes an online banking system that allows the customer to log into his/her account such that the customer can access data that is associated with the customer (e.g., the customer's online banking account). In this regard, the customer can use the computing device 211 to log into the online banking system to access the customer's online banking account. Logging into the online banking system generally requires that the customer authenticate his/her identity using a user name, a passcode, a cookie, a biometric identifier, a private key, a token, and/or another authentication mechanism that is provided by the customer to the online banking system via the computing device 211.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user's computing device 211 (e.g., a mobile device such as a smartphone, cellphone, or tablet computer) includes a communication device 212 and an image capture device 215 (e.g., a camera) communicably coupled with a processing device 214, which is also communicably coupled with a memory device 216. The processing device 214 is configured to control the communication device 212 such that the user's computing device 211 communicates across the network 230 with one or more other systems. The processing device 214 is also configured to access the memory device 216 in order to read the computer readable instructions 218, which in some embodiments includes a capture application 220 and an online banking application 221. In some embodiments, the online banking application 221 may be used to interact with the online banking system. In other embodiments, a web browser application stored on the computing device 211 may be used to interact with the online banking system. The memory device 216 also includes a datastore 222 or database for storing pieces of data that can be accessed by the processing device 214.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 262 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250, the client keying application 251, and the dictionary application 252 may be a suite of applications for conducting OCR or other techniques for extracting information from financial record images.

The applications 220, 221, 250, 251, 252, and 270 are for instructing the processing devices 214, 244 and 264 to perform various steps of the methods discussed herein, and/or other steps and/or similar steps. In various embodiments, one or more of the applications 220, 221, 250, 251, 252, and 270 are included in the computer readable instructions stored in a memory device of one or more systems or devices other than the systems 260 and 240 and the user's computing device 211. For example, in some embodiments, the application 220 is stored and configured for being accessed by a processing device of one or more third party systems 292 connected to the network 230. In various embodiments, the applications 220, 221, 250, 251, 252, and 270 stored and executed by different systems/devices are different. In some embodiments, the applications 220, 221, 250, 251, 252, and 270 stored and executed by different systems may be similar and may be configured to communicate with one another, and in some embodiments, the applications 220, 221, 250, 251, 252, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the user's computing device 211 and/or other systems may perform all or part of one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 500, the other methods discussed below, or other methods, processes or steps discussed herein or not discussed herein.

Referring now to FIG. 3, an exemplary image of a check 300 is illustrated. The image of check 300 may include an image of the entire check, a thumbnail version of the image of the check, individual pieces of check information, all or some portion of the front of the check, all or some portion of the back of the check, or the like. Check 300 includes check information, wherein the check information includes contact information 305, the payee 310, the memo description 315, the account number and routing number 320 associated with the appropriate user or customer account, the date 325, the check number 330, the amount of the check 335, the signature 340, or the like. In some embodiments, the check information may include text. In other embodiments, the check information may include an image. A capture device (e.g., the user's computing device 211 of FIG. 2) may capture an image of the check 300 and transmit the image to a system of a financial institution (e.g., the financial institution system 240 of FIG. 2) via a network. The system may extract the check information from the image of the check 300 and store the check information in a datastore as metadata (e.g., the datastore 254 of FIG. 2). In some embodiments, the pieces of check information may be stored in the datastore individually. In other embodiments, multiple pieces of check information may be stored in the datastore together.

Referring now to FIG. 4, a check template 400 illustrated. In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system of process 100 any other system can "learn" to map the key attributes of the check for faster and more accurate processing. In some embodiments, financial records are categorized by template. The check template 400 is only an exemplary template for a financial record, and other check templates or other financial record templates may be utilized to categorize checks or other financial records. The check template 400 can be used in the OCR processes, image overlay techniques, and the like.

The check template 400 includes check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

In a particular aspect, the present invention is directed to a method for providing person-to-person (P2P) payments based on receiving an image of a negotiable instrument (e.g., a check) from a payor (e.g., a customer wishing to send funds to another person or entity) and then processing the image. In this regard, FIG. 5 depicts an exemplary method 500 for providing person-to-person (P2P) payments, which may be performed by the financial institution system 240 depicted in FIG. 2.

Initially, at block 502, the financial institution system 240 receives an electronic image file containing an image of a negotiable instrument (e.g., a check). Typically, the image file is received from a computing device (e.g., a personal computer, laptop, tablet computer, or smartphone) of a payor (e.g., a customer who wishes to make a payment to a payee). In this regard, the payor may use the computing device (e.g., the computing device 211) to capture an image of a physical check filled out by the payor and then transmit the image of the check to system 240, such as by using an online banking website and/or online banking application.

To facilitate receipt of the electronic image file, the system 240 may establish a communication channel with the computing device of the payor prior to receipt of the electronic image file. In some embodiment, the system 240 may require the payor to provide authentication information (e.g., a username and password) prior to allowing the computing device to send the electronic image file (e.g., via an online banking website and/or online banking application, which may present a graphical user interface (GUI) allowing the payor to transmit an electronic image file to the system 240). In other embodiments, the system 240 may require that the payor provide authentication information prior to processing the electronic image file or prior completing a payment. That said, in further embodiments, the system 240 might not require the payor to provide authentication information in order for the system 240 to receive and process the electronic image file and complete a payment.

Next, at block 504, the financial institution system 240 extracts transaction data, such as financial record data, from the image of the negotiable instrument (e.g., using OCR, IWR, ICR, and/or other image processing techniques). Such extracted transaction data typically includes payee information, payor information, account number, and transaction amount data. The extracted transaction data may also include memo data. In one embodiment, memo data may be any information proximate to (e.g., in the vicinity of) the memo description field of a check. Thus, memo data is not limited to information directly above a check's memo line. Instead memo data may be any information above, below, adjacent to, or in the vicinity of the memo description field. In one embodiment, memo data may be any information located in a quadrant proximate to and including the memo description field. In other embodiments, memo data may be located in an alternative location on a check that is not proximate to the memo description field. For example, such an alternative location may include the ordinarily blank portion of the check above the payee line field or below the signature line field. Such an alternative location for memo data may be defined by the financial institution or by the payor.

At block 506, an account of the payor is identified. The account of the payor (e.g., a checking account) may be the account included in the account number and routing number field 420 extracted from the image of the negotiable instrument. In some embodiments, the account may be identified based on receiving an account selection from the payor computing device (e.g., the payor may select the account using a graphical user interface (GUI) provided by an online banking website and/or online banking application). In other embodiments, extracted payor information (e.g., name and address of the payor) may be compared to a payor database to identify an account associated with the payor. In yet other embodiments, authentication information provided by the payor (e.g., provided via the payor computing device) may be compared to a payor database to identify an account associated with the payor. Such a payor database may include a default account through which the payor makes person-to-person payments. This default account may be defined by the payor or by the entity operating the system 240.

In some embodiments, the account of the payor is maintained by the same entity that operates the system 240. In other embodiments, the account of the payor may be maintained by a third party. Identifying the account of the payor may further include identifying routing information associated with the account (e.g., by extracting such information from the negotiable instrument or by retrieving such information from a payor database). This routing information may subsequently be used by the system 240 to make a payment from the payor's account to the payee.

At block 508, extracted payee information (e.g., information that can be used to identify the payee) and other extracted transaction data is compared to a payee information repository to determine if the extracted payee information sufficiently matches information associated with any of the potential payees included in the payee information repository.

In this regard, the payee information repository typically includes a plurality of records, each record being associated with a potential payee. Each record typically includes identification information associated with a potential payee that may be later used to identify such potential payee. The identification information may be any information that may be used to identify a payee, such the payee's name, address, telephone number, email address, social media identifier, or the like. Each record may also include routing information for one or more accounts associated with a potential payee. The routing information may be any information that may be used to send a payment to a payee, such as an account number, routing number, and/or information related to a financial institution maintaining a payee account. If a record includes multiple accounts associated with a potential payee, the record may specify a default account to which payments should be made. This default account may be defined by the payor or by the entity operating the system 240. The payee information repository may be automatically populated by the entity operating the system 240 based on information contained in other entity systems or received from third parties. In other embodiments, records may be created based on potential payees registering with the system 240.

The extracted payee information is compared to the information in the records contained in the payee information repository to determine if the extracted payee information sufficiently matches information contained in a particular record. If the extracted payee information sufficiently matches the information contained in a particular record, then the potential payee associated with the record is the correct payee and the routing information contained in the record may be used to rout payment to the payee. In other words, the system 240 typically identifies payee routing information by comparing extracted transaction data to the records contained in the payee information repository to identify the correct payee and retrieving routing information contained in the record associated with the correct payee.

In some embodiments, the system 240 may be configured so that matching a name included in the extracted payee information to a name included in a payee record is insufficient to determine that such payee record includes the correct payee. However, in addition to a matching name, if additional extracted transaction data (e.g., an address, telephone number, or email address) matches corresponding information in a payee record, the system may then determine that such payee record is associated with the correct payee. Accordingly, in some embodiments, extracted memo data may also be compared with the records in the payee information repository. For example, the extracted payee information may include the name of the payee, and the extracted memo data may include the telephone number or email address for the payee, which, in combination, may be sufficient to identify the payee.

In some embodiments, the system 240 may use transaction history associated with the payor to aid in identifying the correct payee. In this regard, extracted transaction data (e.g., payee information, transaction amount, date, and the like) may be compared to previous transactions engaged by the payor. If the extracted payee information matches information contained in a particular record, and if, by comparing extracted transaction data to payor transaction history information, the system determines that the payor previously engaged in transactions with the potential payee associated with such record, then the system 240 may determine that the potential payee associated with such record is the correct payee. For example, the system 240 may identify the correct payee by determining that (i) the name included in the payee line field 410 matches the name in a record and (ii) that the payor engaged in previous transactions with the potential payee associated with the record. In some embodiments, the system 240 may identify the payee based on how similar the extracted transaction data (e.g., date of the negotiable instrument and/or transaction amount) is to previous transactions between the payor and payee. For example, the system 240 may determine that (i) the payor has previously made regular monthly payments of a certain amount to the payee and (ii) the negotiable instrument appears to be the next such payment.

Once the payor account and the payee routing information have been identified, then, at block 510, the system 240 typically transfers an amount equal to the extracted transaction amount from the payor account to the payee via the payee routing information. In this regard, the system 240 may transfer funds directly to an account of the payee or may transfer funds to a financial institution that maintains such account.

However, if the system 240 determines that the extracted transaction data is insufficient to identify the correct payee, at block 512, the system 240 may prompt the payor to provide supplemental payee identification information. For example, the extracted transaction data may not match information contained in any record or may insufficiently match information contained in the records. By way of a particular example, the only matching information may be a payee name extracted from the negotiable instrument and the name contained in a payee record, or a payee name extracted from the negotiable instrument may match names contained in multiple payee records. By way of further example, the system 240 may determine that information contained in a portion of the negotiable instrument, such as the payee line field 410 or the memo description field 415, is unreadable.

The system 240 may prompt the payor to provide the supplemental information through an online banking website (e.g., a mobile banking website) that the payor accesses via a web browser on the payor's computing device or through an online banking application on the payor's computing device. In this regard, the online banking website and/or online banking application may present a graphical user interface (GUI) that is configured to prompt the payor to provide supplemental payee identification information. The graphical user interface is also typically configured to allow the payor to provide supplemental payee identification information to the system 240. The graphical user interface may be configured to display the image of the negotiable instrument or at least a relevant portion of the image of the negotiable instrument (e.g., a portion of the negotiable instrument containing the payee line field 410 or the memo description field 415) to aid the payor in providing supplemental information. The system 240 may be configured to cause the online banking website and/or online banking application being accessed by the payor's computing device to display this graphical user interface. Prior to displaying the graphical user interface, the system 240 may establish a communication channel with the payor computing device.

Thereafter, the system receives (e.g., via the graphical user interface) supplemental payee identification information. The received supplemental payee identification information may be any information that can be used to identify the payee, such the payee's name, address, telephone number, email address, social media identifier, or the like. At block 514, the supplemental payee identification information received from the payor is compared to the records contained in the payee information repository. If the supplemental payee identification information in combination with the extracted transaction data sufficiently matches information contained in a payee record, then such record includes the correct payee, and the system 240 proceeds with transferring funds to the payee as described with respect to block 510. For example, the name of the payee may be extracted from the image of the negotiable instrument, but the name of the payee matches names contained in more than one payee record. Accordingly, the system 240 then prompts the payor to provide supplemental payee identification information. The payor then provides the payee's telephone number, which is used by the system 240 to identify the correct payee.

However, if the system 240 determines that the received supplemental payee identification information is still insufficient to identify the payee, or as an alternative to requesting supplemental payee identification information, the system 240 may communicate a request for payment routing information to the payee. To communicate the request the system 240 may use payee contact information extracted from the image of the negotiable instrument or provided by the payor (e.g., the payee contact information may be supplemental payee identification information provided by the payor). Such payee contact information may be the payee's email address, telephone number, mailing address, social media identifier, or the like. If the system 240 does not have payee contact information, the system 240 may prompt the payor to provide such information. In some embodiments, the system 240 may also communicate a request that the payee register with the system 240. In some embodiments, the system 240 may communicate a request for payment routing information to the payee, if the system 240 is able to identify a record associated with the payee, but the record does not include routing information or includes routing information for multiple accounts without defining a default or preferred account. After communicating a request for payment routing information to the payee, the system 240 may determine that the payee has provided payment routing information. This payment routing information then becomes the payee routing information used to provide payment to the payee. This payment routing information may also be used to update a record contained in the payee information repository and associated with the payee.

In some embodiments, prior to transferring funds to the payee, the system 240 may communicate a payment confirmation request to the payor. In this regard, the system 240 may prompt (e.g., cause) the payor computing device to display a graphical user interface requesting that the payor confirm payment. Prior to displaying the graphical user interface, the system 240 may establish a communication channel with the payor computing device. To aid the payor in determining whether to confirm payment, the graphical user interface may include payee information retrieved from the identified payee record, such as the identified payee's name, mailing address, email address, zip code, city and state of residence, telephone number, social media identifier, or the like. The graphical user interface may also include an image of the negotiable instrument (or at least relevant portions of the negotiable instrument used by the system 240 to identify the payee) to further aid the payor in determining whether to confirm payment. Thereafter, once a payment confirmation is received from the payor (e.g., from the payor's computing device), the system 240 may proceed with transferring funds to the payee as described with respect to block 510.

In some embodiments, prior to transferring funds to the payee, the system 240 may process the image of the negotiable instrument to determine if the negotiable instrument is valid. For example, the system 240 may determine if: the routing number included on the negotiable instrument corresponds to the financial institution included on the negotiable instrument; the image of the negotiable instrument includes required watermarks; the name, address, and/or account number of the payor extracted from the negotiable instrument match corresponding records held by the entity operating the system 240; and/or the information extracted from the amount box field 435 of the negotiable instrument matches the spelled-out amount extracted from the negotiable instrument. In some embodiments, the system 240 may compare the signature included on the negotiable instrument with previous payor signatures to determine if the signature on the negotiable instrument appears to be valid. If the system 240 determines that the negotiable instrument may be invalid, the system typically will not complete the payment and may notify the payor that the payment cannot be completed. Otherwise, the system 240 may complete the payment.

In some embodiments, following completion of the payment, the system 240 may be configured to invite the payor to register for a person-to-person (P2P) payment program operated by the entity operating the system 240. Such a P2P payment program may allow the payor to make future person-to-person payments without having to submit an image of a filled-out negotiable instrument to the system 240.

In a particular embodiment, the method for providing person-to-person (P2P) payments described herein may be used to make payments to the entity (e.g., a financial institution) that maintains or operates the system 240. In this regard, initially the system 240 may receive an electronic image file containing an image of a negotiable instrument. The system may process the image to extract transaction data. Next, an account of the payor may be identified as described above. In addition, the system 240 may compare extracted transaction data to a payee information repository in order to identify the correct payee. In this regard, the payee line field 410 may include the name of the entity. Alternatively, the payee line field 410, the memo description field 415, or another portion of the negotiable instrument may include a word or phrase, such as "mortgage," "car payment," or "pay credit card," indicating that the payor wishes make a payment to the entity. If the system 240 is unable to use the extracted transaction data to identify the payee, the system 240 may prompt the payor for supplemental payee identification information. Once the system 240 is able to use the extracted transaction data to identify the correct payee and payee routing information based on comparing extracted transaction data to records in the payee information repository, the system 240 may transfers an amount equal to an extracted transaction amount from the payor account to the payee via the payee routing information identified from the payee information repository. If the payee is the entity, the system 240 may identify a debt account that is associated with the payor and maintained by the entity. As used herein, a debt account may be any type of account for which the payor owes money (e.g., to the entity). For example, the debt account may be a credit card account, a mortgage, or a loan (e.g., a car loan, personal loan, or commercial loan). The system 240 may use extracted transaction data to identify the debt account. For example, the negotiable instrument may include a word or phrase, such as "mortgage," "car payment," or "pay credit card," which, along with the payor's identity, that can be used to identify the correct debt account of the payor. By way of further example, the negotiable instrument may include an account number for the correct debt account. Alternatively, if the payee is the entity and the payor only has one debt account maintained by the entity, then the system may automatically determine that such debt account is the correct debt account. However, if the system 240 is unable to identify the correct debt account (e.g., because the payor only include the name of the entity in the payee line field 410, and the payor has multiple debt account maintained by the entity), the system 240 may present a graphical user interface to payor, thereby allowing the payor to identify the correct debt account. Once the correct debt account has been identified, and based on making the payment to the entity, the system may apply a credit to the balance of the payor debt account, the credit being equal to the payment amount. Accordingly, the system may be used to make payments to the entity.

In some embodiments, the system 240 may be configured to perform the foregoing steps in near real time, such that following receipt of the electronic image file containing the image of the negotiable instrument, the remaining steps are performed nearly simultaneously, but for minimal delays (e.g., of a few seconds) inherent in data processing and transmission.

As evident from the preceding description, the system described herein represents an improvement in technology by allowing a payor who has not yet registered for a P2P payments program, or is otherwise uncomfortable using such a P2P payments program, to make prompt person-to-person payments. Accordingly, the system provides a technical solution for overcoming the problem of a payor wanting to make a prompt person-to-person payment without requiring the payor to register for a P2P payments program and without requiring the payor to provide a physical check to the payee. As such, the system allows a payor to use a conventional check to make a payment, but nevertheless provide for nearly instantaneous payments, which is not otherwise possible using checks. In addition, the system may be able to validate the check without requiring the payor to provide further authentication information, thereby further reducing the burden in making person-to-person payments.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computerized person-to-person asset routing system, comprising:
   a computer apparatus including a processor, a memory, and a network communication device; and
   a person-to-person asset routing module stored in the memory, executable by the processor and configured for:
      capturing, via a capture device of a payor computing device of a payor, an image of a paper check;
      receiving an electronic image file containing the image of the paper check from the payor computing device of the payor;
      processing the image of the paper check to extract transaction data, wherein processing the image of the paper check comprises extracting a transaction amount and payee identification information, wherein the transaction amount and payee identification information extracted from the image of the paper check comprise alphanumeric text extracted from the image of the paper check contained in the electronic image file;

identifying a payor account;

determining that at least a portion of the extracted payee identification information is unreadable;

in response to determining that at least the portion of the extracted payee identification information is unreadable, prompting the payor computing device to display a graphical user interface, the graphical user interface being configured to (i) display a portion of the image of the paper check, the portion of the image comprising the unreadable payee identification information, and (ii) prompt the payor to provide supplemental payee identification information;

receiving, via the graphical user interface, the supplemental payee identification information;

comparing the extracted payee identification information and supplemental payee identification information to a payee information repository;

determining that the supplemental payee identification information is insufficient to identify a payee based on determining that the supplemental payee identification information comprises a name, but not other identifying information, of the payee;

in response to determining that the supplemental payee identification information is insufficient to identify the payee, prompting the payor to provide further supplemental payee identification information via the graphical user interface;

receiving, via the graphical user interface, the further supplemental payee identification information;

based on comparing the extracted identification information, supplemental payee identification information, and further supplemental payee identification information to the payee information repository, identifying payee routing information associated with the payee; and based on identifying the payor account and the payee routing information, transferring an amount equal to the transaction amount from the payor account to the payee via the payee routing information, wherein the payor is not registered for a person-to-person payment program prior to transferring the amount equal to the transaction amount from the payor account to the payee.

2. The computing system according to claim 1, wherein:
the person-to-person asset routing module is configured for:
determining that the supplemental payee identification information is insufficient to identify the payee routing information;
based on determining that the supplemental payee identification information is insufficient to identify the payee routing information, communicating a payment routing information request to the payee; and
thereafter, determining that the payee has provided payment routing information;
identifying the payee routing information associated with the payee is further based on the payment routing information provided by the payee.

3. The computing system according to claim 1, wherein the person-to-person asset routing module is configured for comparing the extracted transaction data to transaction history information associated with the payor; and
identifying the payee routing information associated with the payee is further based on comparing the extracted transaction data to the transaction history information associated with the payor.

4. The computing system according to claim 1, wherein:
the person-to-person asset routing module is configured for:
based on identifying the payee routing information, retrieving stored payee information from the payee information repository, the stored payee information being associated with the payee routing information;
prompting the payor computing device to display the graphical user interface, the graphical user interface being configured to (i) display the stored payee information and (ii) prompt the payor to provide a payment confirmation; and
receiving the payment confirmation from the payor computing device;
transferring the amount equal to the transaction amount from the payor account to the payee via the payee routing information is further based on receiving the payment confirmation from the payor computing device.

5. The computing system according to claim 1, wherein:
processing the image of the paper check comprises extracting payor account information; and
identifying the payor account is based on the extracted payor account information.

6. The computing system according to claim 1, wherein identifying the payor account is based on payor account information received from the payor computing device.

7. The computing system according to claim 1, wherein the person-to-person asset routing module is configured for:
identifying a payor debt account defining a balance, the debt account being maintained by the payee; and
based on identifying the payor debt account and transferring the amount from the payor account to the payee, applying a credit to the balance of the payor debt account, the credit being equal to the transferred amount.

8. A computer program product for providing person-to-person asset routing, comprising a non-transitory computer-readable storage medium having computer-executable instructions for:
capturing, via a capture device of a payor computing device of a payor, an image of a paper check;
receiving an electronic image file containing the image of the paper check from the payor computing device of the payor;
processing the image of the paper check to extract transaction data, wherein processing the image of the paper check comprises extracting a transaction amount and payee identification information, wherein the transaction amount and payee identification information extracted from the image of the paper check comprise alphanumeric text extracted from the image of the paper check contained in the electronic image file;
identifying a payor account;
determining that at least a portion of the extracted payee identification information is unreadable;
in response to determining that at least the portion of the extracted payee identification information is unreadable, prompting the payor computing device to display a graphical user interface, the graphical user interface being configured to (i) display a portion of the image of the paper check, the portion of the image comprising the unreadable payee identification information, and (ii) prompt the payor to provide supplemental payee identification information;

receiving, via the graphical user interface, the supplemental payee identification information;

comparing the extracted payee identification information and supplemental payee identification information to a payee information repository;

determining that the supplemental payee identification information is insufficient to identify a payee based on determining that the supplemental payee identification information comprises a name, but not other identifying information, of the payee;

in response to determining that the supplemental payee identification information is insufficient to identify the payee, prompting the payor to provide further supplemental payee identification information via the graphical user interface;

receiving, via the graphical user interface, the further supplemental payee identification information;

based on comparing the extracted identification information, supplemental payee identification information, and further supplemental payee identification information to the payee information repository, identifying payee routing information associated with the payee; and based on identifying the payor account and the payee routing information, transferring an amount equal to the transaction amount from the payor account to the payee via the payee routing information, wherein the payor is not registered for a person-to-person payment program prior to transferring the amount equal to the transaction amount from the payor account to the payee.

9. The computer program product according to claim 8, wherein:
the non-transitory computer-readable storage medium has computer-executable instructions for:
determining that the supplemental payee identification information is insufficient to identify the payee routing information;
based on determining that the supplemental payee identification information is insufficient to identify the payee routing information, communicating a payment routing information request to the payee; and
thereafter, determining that the payee has provided payment routing information;
identifying the payee routing information associated with the payee is further based on the payment routing information provided by the payee.

10. The computer program product according to claim 8, wherein
the non-transitory computer-readable storage medium has computer-executable instructions for comparing the extracted transaction data to transaction history information associated with the payor; and
identifying the payee routing information associated with the payee is further based on comparing the extracted transaction data to the transaction history information associated with the payor.

11. The computer program product according to claim 8, wherein:
the non-transitory computer-readable storage medium has computer-executable instructions for:
based on identifying the payee routing information, retrieving stored payee information from the payee information repository, the stored payee information being associated with the payee routing information;
prompting the payor computing device to display the graphical user interface, the graphical user interface being configured to (i) display the stored payee information and (ii) prompt the payor to provide a payment confirmation; and
receiving the payment confirmation from the payor computing device;
transferring the amount equal to the transaction amount from the payor account to the payee via the payee routing information is further based on receiving the payment confirmation from the payor computing device.

12. The computer program product according to claim 8, wherein:
processing the image of the paper check comprises extracting payor account information; and
identifying the payor account is based on the extracted payor account information.

13. The computer program product according to claim 8, wherein identifying the payor account is based on payor account information received from the payor computing device.

14. The computer program product according to claim 8, wherein the non-transitory computer-readable storage medium has computer-executable instructions for:
identifying a payor debt account defining a balance, the debt account being maintained by the payee; and
based on identifying the payor debt account and transferring the amount from the payor account to the payee, applying a credit to the balance of the payor debt account, the credit being equal to the transferred amount.

15. A method for providing person-to-person asset routing, comprising:
capturing, via a capture device of a payor computing device of a payor, an image of a paper check;
receiving, via a computer processor, an electronic image file containing the image of the paper check from the payor computing device of the payor;
processing, via a computer processor, the image of the paper check to extract transaction data, wherein processing the image of the paper check comprises extracting a transaction amount and payee identification information, wherein the transaction amount and payee identification information extracted from the image of the paper check comprise alphanumeric text extracted from the image of the paper check contained in the electronic image file;
identifying, via a computer processor, a payor account;
determining that at least a portion of the extracted payee identification information is unreadable;
in response to determining that at least the portion of the extracted payee identification information is unreadable, prompting the payor computing device to display a graphical user interface, the graphical user interface being configured to (i) display a portion of the image of the paper check, the portion of the image comprising the unreadable payee identification information, and (ii) prompt the payor to provide supplemental payee identification information;

receiving, via the graphical user interface, the supplemental payee identification information;

comparing, via a computer processor, the extracted payee identification information and supplemental payee identification information to a payee information repository;

determining, via a computer processor, that the supplemental payee identification information is insufficient to identify a payee based on determining that the supplemental payee identification information comprises a name, but not other identifying information, of the payee;

in response to determining that the supplemental payee identification information is insufficient to identify the payee, prompting, via a computer processor, the payor to provide further supplemental payee identification information via the graphical user interface;

receiving, via the graphical user interface, the further supplemental payee identification information;

based on comparing the extracted identification information, supplemental payee identification information, and further supplemental payee identification information to the payee information repository, identifying, via a computer processor, payee routing information associated with the payee; and based on identifying the payor account and the payee routing information, transferring, via a computer processor, an amount equal to the transaction amount from the payor account to the payee via the payee routing information, wherein the payor is not registered for a person-to-person payment program prior to transferring the amount equal to the transaction amount from the payor account to the payee.

16. The method according to claim 15, comprising:

determining that the supplemental payee identification information is insufficient to identify the payee routing information;

based on determining that the supplemental payee identification information is insufficient to identify the payee routing information, communicating a payment routing information request to the payee; and thereafter, determining that the payee has provided payment routing information;

wherein identifying the payee routing information associated with the payee is further based on the payment routing information provided by the payee.

17. The method according to claim 15, wherein the method comprises comparing the extracted transaction data to transaction history information associated with the payor; and identifying the payee routing information associated with the payee is further based on comparing the extracted transaction data to the transaction history information associated with the payor.

18. The method according to claim 15, comprising:

based on identifying the payee routing information, retrieving stored payee information from the payee information repository, the stored payee information being associated with the payee routing information;

prompting the payor computing device to display the graphical user interface, the graphical user interface being configured to (i) display the stored payee information and (ii) prompt the payor to provide a payment confirmation; and receiving the payment confirmation from the payor computing device;

wherein transferring the amount equal to the transaction amount from the payor account to the payee via the payee routing information is further based on receiving the payment confirmation from the payor computing device.

19. The method according to claim 15, wherein:

processing the image of the paper check comprises extracting payor account information; and identifying the payor account is based on the extracted payor account information.

20. The method according to claim 15, wherein identifying the payor account is based on payor account information received from the payor computing device.

21. The method according to claim 15, comprising:

identifying a payor debt account defining a balance, the debt account being maintained by the payee; and based on identifying the payor debt account and transferring the amount from the payor account to the payee, applying a credit to the balance of the payor debt account, the credit being equal to the transferred amount.

* * * * *